United States Patent
Wilkinson et al.

(10) Patent No.: US 9,346,119 B2
(45) Date of Patent: May 24, 2016

(54) OBJECT FORMING ASSEMBLY

(75) Inventors: Stephen J. Wilkinson, Barrowford (GB); Jonathan M. Taylor, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 13/224,970

(22) Filed: Sep. 2, 2011

(65) Prior Publication Data

US 2012/0060704 A1 Mar. 15, 2012

(30) Foreign Application Priority Data

Sep. 14, 2010 (GB) .................................. 1015267.6

(51) Int. Cl.
*B30B 13/00* (2006.01)
*B23K 20/02* (2006.01)
*C04B 35/645* (2006.01)

(52) U.S. Cl.
CPC ........... *B23K 20/021* (2013.01); *C04B 35/6455* (2013.01); *B23K 2203/14* (2013.01)

(58) Field of Classification Search
CPC .. B30B 9/3042; B30B 11/001; B30B 9/3003; B22F 3/15; B22F 3/008; B22F 3/16; B29C 67/0066; B29C 2035/0822; B29C 67/0077; C04B 35/6455; B23P 15/00; B23P 15/04; F01D 5/005; F01D 5/147; B21D 53/78; B23K 15/0053; B23K 15/06; B23K 20/021; B23K 26/0078; B23K 2201/006; B23K 2201/045; B23K 2203/14; F04D 29/023; F04D 29/324; F05D 2240/303; F05D 2240/304; Y02T 50/672; Y10T 29/49337; Y10T 29/49339
USPC ........ 100/229 A; 419/49; 425/78, 174.4, 375, 425/324.1; 264/604; 29/447, 505; 148/519, 148/590–593, 548, 607, 622, 671, 672, 674, 148/677
See application file for complete search history.

(56) References Cited

U.S. PATENT DOCUMENTS 4,379,725 A * 4/1983 Kemp ............................ 148/630
4,575,327 A * 3/1986 Borchert et al. ................. 425/78
(Continued)

FOREIGN PATENT DOCUMENTS

EP     1 547 707 A2    6/2005
GB     1 557 744       12/1979
(Continued)

OTHER PUBLICATIONS

Hagedorn et al. Science Direct. Net Shaped High Performance Oxide Ceramic Parts by Selective Laser Melting. Physics Procedia 5 (2010) 587-594.*

(Continued)

*Primary Examiner* — Shelley Self
*Assistant Examiner* — Onekki Jolly
(74) *Attorney, Agent, or Firm* — Oliff PLC

(57) ABSTRACT

An assembly configured to modify a surface or feature of a workpiece by hot isostatic pressing. The assembly comprising: a flexible membrane adapted to at least partially form an enclosure around the workpiece; and a former for placement adjacent to the workpiece, the former being configured to modify the surface or feature of the workpiece. A method of modifying a surface or feature of a workpiece, the workpiece having been previously formed by an additive manufacturing technique, by hot isostatic pressing. The method comprising: placing the previously-formed workpiece adjacent to a former adapted to modify the surface or feature of the workpiece; enclosing the workpiece in an enclosure at least partially formed by a membrane; and performing a hot isostatic pressing process on the workpiece.

6 Claims, 1 Drawing Sheet

(56) References Cited

U.S. PATENT DOCUMENTS

Figure 1:
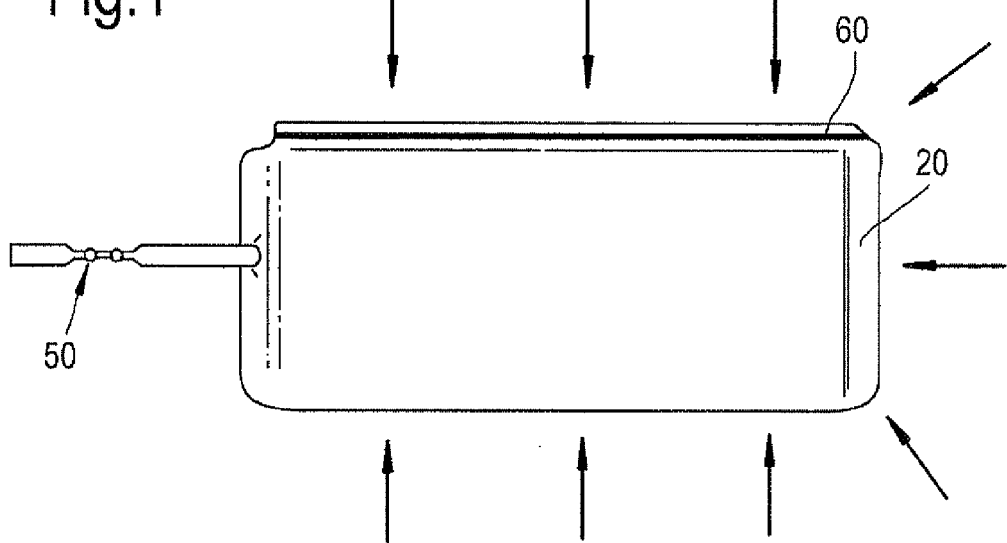

| | | | |
|---|---|---|---|
| 4,601,878 A * | 7/1986 | Aslund et al. | 419/49 |
| 4,729,730 A * | 3/1988 | Hatayama et al. | 425/405.2 |
| 4,861,546 A | 8/1989 | Friedman | |
| 4,863,538 A * | 9/1989 | Deckard | 264/497 |
| 4,935,198 A * | 6/1990 | Tornberg | 419/8 |
| 5,092,023 A * | 3/1992 | Boncoeur et al. | 29/892 |
| 5,147,086 A * | 9/1992 | Fujikawa et al. | 228/235.1 |
| 5,874,015 A | 2/1999 | Mittendorf et al. | |
| 5,997,273 A * | 12/1999 | Laquer | B01J 3/06 425/394 |
| 6,986,381 B2 * | 1/2006 | Ray et al. | 164/529 |
| 7,351,051 B2 * | 4/2008 | Hagiwara | 425/174.4 |
| 2005/0142023 A1 * | 6/2005 | Voice et al. | 419/38 |

FOREIGN PATENT DOCUMENTS

| | | |
|---|---|---|
| JP | A-63-93802 | 4/1988 |
| JP | A-8-27504 | 1/1996 |

OTHER PUBLICATIONS

Search Report issued in British Patent Application No. 1015267.6 dated Nov. 24, 2010.

* cited by examiner

OBJECT FORMING ASSEMBLY

This disclosure relates to an object forming assembly and particularly but not exclusively relates to an object forming assembly using hot isostatic pressing.

Hot Isostatic Pressing (HIP) is a manufacturing process which subjects a workpiece to both an elevated temperature and isostatic gas pressure in a high pressure chamber. HIP is commonly used to densify components, by eliminating internal voids and porosity. It is particularly used to consolidate and sinter components produced by powder metallurgy processes.

As an alternative to powder metallurgy, it is known to produce components by additive manufacture, including laser deposition and powder layer techniques. Such techniques offer the advantage, compared with traditional manufacturing processes, that they produce components with good grain structure and uniform mechanical properties. However, a disadvantage of this type of additive manufacture is that it often produces components with a relatively poor surface finish, and consequently further processing of the component is required to bring the surface finish to an acceptable standard. This is a particular problem where the component includes hard-to-access features whose surface cannot be reached by conventional machining techniques. This problem restricts the range of components that can be produced using additive manufacture techniques.

It is an aim of the invention to provide an apparatus and method that can improve the surface finish of a component, particularly of hard-to-access features. Such an apparatus and method could be applied to components produced by any manufacturing method, but would be particularly advantageous for additive manufacture techniques.

According to a first aspect of the present disclosure there is provided an assembly for forming an object from a workpiece by hot isostatic pressing, wherein the assembly is configured to improve the surface finish of the workpiece.

According to a second aspect of the present disclosure there is provided an assembly for forming an object from a workpiece by hot isostatic pressing, the assembly comprising: a membrane adapted to at least partially form an enclosure around the workpiece; and a former for placement adjacent to the workpiece, the former being configured to form a surface of the object.

The membrane may comprise a bag.

The former and the membrane may be joined such that they together form the enclosure.

The membrane may be flexible. The membrane may be made from steel, for example mild steel, and may be a thin film sheet, e.g. a foil. The object may be made from titanium. The workpiece may initially comprise a powder, a solid or semi-solid material. The former may be made from a ceramic or from a high temperature alloy.

The membrane may form the enclosure by virtue of a seal along an edge of the membrane.

The assembly may comprise an evacuation pipe. The evacuation pipe may be configured to evacuate fluid from the enclosure.

According to a third aspect of the present disclosure there is provided a method of forming an object from a workpiece by hot isostatic pressing, the method comprising: enclosing the workpiece in an enclosure at least partially formed by a membrane; and placing the workpiece adjacent to a former adapted to form a surface of the object.

The method may further comprise sealing the membrane to form the enclosure. The membrane may be sealed with respect to itself and/or the former.

The method may comprise evacuating fluid from the enclosure formed by the membrane. The method may further comprise removing the membrane from the object once the object has been formed.

According to a fourth aspect of the present disclosure there is provided an assembly for forming an object under one or more of pressure and temperature, the assembly comprising: a membrane adapted to at least partially enclose the object; and a former for placement adjacent to the object, the former being adapted to form a surface of the object.

Advantages of the present disclosure comprise, but are not limited to, the following features:

improved surface finish in inaccessible areas;

improved component performance as there are no stress raisers in the inaccessible areas;

surface features and accurate geometries may be created at the same time;

the process lends itself to production volumes;

less waste of raw material;

the effect of material properties detrimental to subsequent surface modification processes (e.g. spring-back) is lessened;

reduced manufacturing time and reduced manufacturing operation steps, meaning lower manufacturing costs and reduced chance of scrap;

hydraulic or hydrostatic HIP gives even pressures and consistent consolidation;

former or solid mould enables a static datum (i.e. no datum transfer during manufacture).

Figure 2:
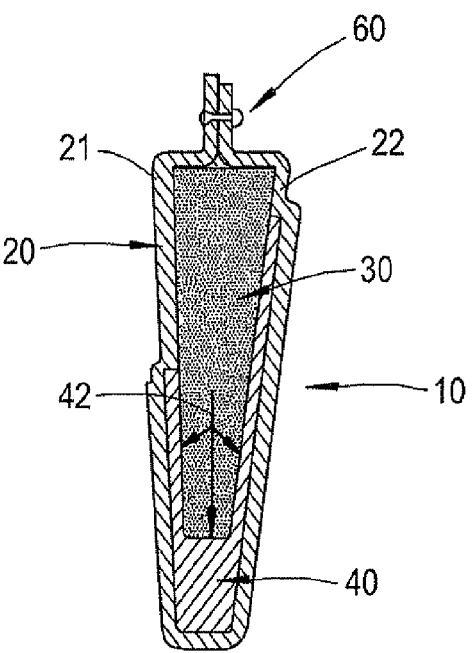

For a better understanding of the present invention, and to show more clearly how it may be carried into effect, reference will now be made, by way of example, to the accompanying drawings, in which:

FIG. 1 is a side view of the object forming assembly according to an example of the present disclosure; and FIG. 2 is an end-on sectional view of the object forming assembly according to the example of the present disclosure.

With reference to FIGS. 1 and 2, an object forming assembly 10 according to an example of the present disclosure may comprise a membrane 20 and a former 30. The object forming assembly 10 may form an object, e.g. a part, component or article, from a workpiece 40 by hot isostatic pressing (HIP). The workpiece 40 may comprise a solid structure, which may have been formed by an additive manufacture technique. The workpiece and hence the formed object may be made from titanium.

The membrane 20 may be a flexible membrane adapted to at least partially form an enclosure around the workpiece 40. For example, the membrane 20 may comprise a sheet-like barrier of material, which may be substantially impermeable to fluids. The membrane 20 may comprise a thin foil or film. The membrane 20 may be made from steel, in particular mild steel. The membrane 20 may be approximately 0.1 mm thick.

As shown, the enclosure may be entirely formed by the membrane 20. For example, the membrane 20 may be in the form of a bag. The membrane 20 may form the enclosure by virtue of a seal 60, e.g. a weld, along one or more edges of the membrane. For example, the seal 60 may join adjacent edges of the membrane once it has been folded to form first and second opposing sides 21, 22.

In an alternative arrangement (not shown), the enclosure may be partially formed by the membrane. For example, the former and the membrane may be joined along respective edges such that they together form the enclosure. In other words, the bag or flexible membrane may form part of a mould and a solid surface or former may form the remainder of the mould. As a result, all the consolidation of the workpiece during the hot isostatic pressing may occur on one side of the mould (e.g. adjacent to the membrane). By contrast, a surface of the object upon which a specific feature is to be formed, e.g. a precision surface, may be next to the former.

The former 30 may be placed adjacent to the workpiece 40. The former 30 may be configured to form a surface and/or feature 42 of the object, for example by impressing the shape of the former surface upon a corresponding surface of the workpiece 40. The former 30 may be made from a hard material, e.g. one that does not change shape significantly under the temperatures, pressures and forces encountered during hot isostatic pressing. For example, the former 30 may be made from a ceramic or from a high temperature alloy.

The enclosure formed by the membrane 20 may optionally be evacuated of any fluid prior to the HIP process. In order to evacuate the enclosure, the assembly 10 may further comprise an evacuation pipe 50 configured to evacuate fluid from the enclosure. At one end, the evacuation pipe 50 may be joined, e.g. sealed, to the membrane 20. At the other end, the evacuation pipe 50 may be connected to a pump or equivalent device for extracting fluid from the enclosure formed by the membrane 20. The evacuation pipe 50 may comprise a valve which may be closed to maintain a vacuum within the enclosure.

The workpiece 40 may be assembled onto the former 30, which may be a ceramic matrix or high temperature alloy support tool with an appropriate barrier coating applied thereon. The workpiece 40 may then be wrapped in the membrane 20. The membrane 20 may be sealed with respect to itself and/or the former 30 to form the enclosure surrounding the workpiece. The seam 60 may be formed using an established technique such as seam, TIG or laser welding. A pre-existing evacuation tube 50 in the membrane 20 may be used to evacuate the enclosure. The evacuation tube 50 may then be sealed, e.g. by closing the valve and by welding, prior to inserting the assembly 10 into a HIP vessel (not shown).

A HIP cycle may be applied to the workpiece. The HIP cycle variables, e.g. temperature, pressure and time, may depend upon the materials being used. The HIP cycle temperature may be increased before the pressure.

After the HIP cycle the object may be removed from the HIP vessel. The membrane 20 may be stripped and the former 30 removed for re-use. The features that have been pressed into the object by the former may require no further processing. Other external features may be further processed in a conventional way.

One or more of the thickness of the membrane, the membrane material, the workpiece material and the HIP pressure may be selected so that the membrane does not distort the workpiece dimensionally. Any of the aforementioned variables may also be selected to ensure that the membrane has a stiffness that permits the membrane to conform to the shape of the workpiece, whilst ensuring that the membrane material is stiffer than the workpiece once the HIP pressure and temperature are reached such that the workpiece surface may deform to the surface finish of the membrane. The main variables for selection are the membrane material, its thickness and the HIP pressure and temperature.

The present disclosure relates to an object forming assembly and method to improve the surface finish of an object formed using HIP. The surface finish may be improved by wrapping the workpiece in a flexible membrane or bag, which may be sealed. By using a former to support the workpiece during HIP, the surface finish of an adjacent face or feature may be impressed upon the workpiece, thereby locally changing its shape. The membrane and former may be removed from the finished object after processing. Accordingly, the present disclosure allows the surface features of the workpiece during the HIP process to be changed.

The present disclosure may be applied to a range of material types and may be applied to any product. In particular, the above-described process maybe applied to a component for a gas turbine engine, for example combustor nozzles and similar parts. The present disclosure may also have applications in the medical and automotive sectors.

The process particularly lends itself to thin walled parts and parts with a large surface area having difficult to access features. The process may be applied to parts where manual finishing operations are not desirable or possible.

The above-described process may be optimised for particular applications, for example a process using powder additive manufacture techniques, although the present disclosure is not limited to this manufacturing method. A lower-energy, shorter HIP cycle could be used for particular applications for savings in time and cost.

The invention claimed is:

1. A method of modifying a surface or feature of a workpiece by hot isostatic pressing, the workpiece having been previously formed by an additive manufacturing technique, the method comprising:
   placing the previously-formed workpiece adjacent to a former having a hardness or stiffness greater than that of the workpiece and that is adapted to modify the surface or feature of the workpiece;
   enclosing the workpiece in an enclosure at least partially formed by a flexible membrane; and
   performing the hot isostatic pressing process on the workpiece.

2. The method of claim 1, further comprising sealing the membrane to form the enclosure.

3. The method of claim 2, further comprising sealing the membrane with respect to one or more of the membrane and the former.

4. The method of claim 1, further comprising evacuating fluid from the enclosure at least partially formed by the membrane.

5. The method of claim 1, further comprising removing the membrane from the workpiece.

6. The method of claim 1, further comprising enclosing the workpiece in the enclosure so that the membrane directly contacts the surface of the workpiece.

\* \* \* \* \*